United States Patent [19]

Maucher

[11] Patent Number: 4,638,684

[45] Date of Patent: Jan. 27, 1987

[54] ASSEMBLY FOR TAKING UP AND COMPENSATING FOR TORQUE-INDUCED SHOCKS

[75] Inventor: Paul Maucher, Sasbach, Fed. Rep. of Germany

[73] Assignee: Luk Lamellen und Kupplungsbau GmbH, Bühl, Fed. Rep. of Germany

[21] Appl. No.: 661,028

[22] Filed: Oct. 15, 1984

[30] Foreign Application Priority Data

Oct. 24, 1983 [DE] Fed. Rep. of Germany ....... 3338574
Mar. 5, 1984 [DE] Fed. Rep. of Germany ....... 3410367

[51] Int. Cl.$^4$ ............................................. F16D 43/04
[52] U.S. Cl. ...................... 74/574; 192/70.17; 192/103 R; 192/106.2
[58] Field of Search ............... 192/70.17, 106.1, 106.2, 192/103 R, 103 B, 104 C; 74/574; 464/37, 66, 68, 81

[56] References Cited

U.S. PATENT DOCUMENTS

2,514,228 7/1950 Dodge ............................. 192/104 C
3,296,887 1/1967 Larsen ..................................... 74/574
3,804,222 4/1974 Reams ........................... 192/103 B
4,410,074 10/1983 Maucher et al. .................... 192/48.7

FOREIGN PATENT DOCUMENTS

1022890 1/1958 Fed. Rep. of Germany ... 192/103 B
2926012 10/1980 Fed. Rep. of Germany .
56845 7/1952 France .............................. 192/104 C Primary Examiner—Rodney H. Bonck
Assistant Examiner—Alan G. Towner
Attorney, Agent, or Firm—Peter K. Kontler

[57] ABSTRACT

The action of a primary damping device between two coaxial parts of a flywheel which is driven by the crankshaft of the engine in a motor vehicle and transmits torque to the input shaft of the change-speed transmission is influenced by a blocking device, by a friction generating device or by an auxiliary damping device in such a way that the resistance which the primary damping device offers to rotation of the two parts relative to each other decreases with increasing RPM of the engine. The blocking device, the friction generating device and the auxiliary damping device can be operated by centrifugal force in such a way that the two parts of the flywheel are positively or frictionally coupled to each other when the RPM of the engine is at or below the idling RPM.

26 Claims, 6 Drawing Figures

ASSEMBLY FOR TAKING UP AND COMPENSATING FOR TORQUE-INDUCED SHOCKS

BACKGROUND OF THE INVENTION

The present invention relates to improvements in assemblies which are used to take up and to compensate for shocks which develop as a result of fluctuations in the rotational speed of flywheels or other rotary parts. More particularly, the invention relates to improvements in assemblies which can be used with advantage in internal combustion engines to take up and compensate for fluctuations in torque of at least two coaxial parts which are rotatable, within limits, with reference to each other. Still more particularly, the invention relates to improvements in assemblies which can be used in internal combustion engines to resist rotation of two parts of a flywheel relative to each other, especially relative rotation of two parts one of which receives torque from the engine and the other of which transmits torque to the input element of a change-speed transmission in a motor vehicle.

Assemblies of the above outlined character are disclosed, for example, in German Offenlegungsschrift No. 2 926 012. The damping action between two rotary parts which can move (within limits) angularly with reference to each other is furnished by energy storing devices in the form of coil springs and by a friction generating unit which operates in parallel with the coil springs. The arrangement is such that the coil springs offer a progressively increasing resistance to further angular displacement of the two parts relative to each other from a neutral or starting position. Thus, the coil springs will yield rather readily when one of the parts begins to change its angular position relative to the other part, and such resistance increases progressively with increasing angular displacement of the one part relative to the other part. At the same time, the resistance of the friction generating device, which operates in parallel with the coil springs, remains at least substantially unchanged.

Assemblies which embody the just discussed damping devices operate in such a way that their critical fundamental frequency, i.e., the critical RPM of the driven and driving parts, develops at a resonance which is below the ignition cycle frequency when the RPM of the engine is at a minimum value, i.e., the lowest RPM at which the engine is still in operation. However, when an internal combustion engine is started or turned off, it often takes a reasonably long interval of time during which the RPM is within the critical range so that the vibration amplitude of the two parts which are rotatable relative to each other increases still further as a result of excitation within such range of rotational speeds. These high-amplitude vibrations generate alternating torque of such magnitude that the damping system between the two parts undergoes maximum deformation and acts as a rigid link between the two parts. In other words, the damping device then ceases to take up and/or compensate for torsional stresses and simply acts as a solid anvil which is struck by or strikes against the two parts. The resulting shocks not only affect the comfort of the operator and occupants of the vehicle but they also generate readily detectable noise and shorten the useful life of the connection between the engine and the transmission, of various bearings, of shafts and other parts in the motor vehicle.

OBJECTS AND SUMMARY OF THE INVENTION

An object of the invention is to provide a torsion damping assembly which is not only simpler but also more reliable and more versatile than heretofore known assemblies.

Another object of the invention is to provide an assembly which can take up and compensate for torque-induced shocks in motor vehicles during those stages of operation of the engine when the aforediscussed and other conventional systems cannot do the job.

A further object of the invention is to provide a novel and improved method of influencing the damping means between two relatively rotatable parts in a motor vehicle, especially between two relatively rotatable parts which together constitute or form part of a flywheel between the output element of the engine and the input element of the change-speed transmission in a motor vehicle.

An additional object of the invention is to provide an assembly which is particularly effective during starting and/or turning off of the engine in a motor vehicle.

Another object of the invention is to provide a torsion damping assembly which is not only effective when the engine is started or stopped but also during normal operation of the engine and the motor vehicle.

Still another object of the invention is to provide an assembly of the above outlined character which is not only simpler but also less expensive and longer-lasting than heretofore known assemblies.

A further object of the invention is to provide an assembly whose characteristics can be varied within a wide range so that it can be used in a variety of motor vehicles.

Another object of the invention is to provide novel and improved means for influencing the damping means between two relatively rotatable parts of a flywheel or the like.

The invention is embodied in an assembly for taking up and compensating for torque-induced shocks, especially for taking up and compensating for fluctuations of torque which is transmitted by an internal combustion engine to the input shaft of the change-speed transmission in a motor vehicle. The improved assembly comprises coaxial first and second parts which are mounted for rotation at a variable speed (determined by the RPM of the engine) and for limited angular movement relative to each other. One of the parts receives torque from the engine and the other part transmits torque to the input shaft of the transmission. The assembly further comprises damping means which is operative to resist the relative angular movement of the two parts, and means for regulating or influencing the resistance of the damping means so that such resistance decreases with increasing rotational speed of the two parts. In accordance with a presently preferred embodiment of the invention, the regulating means is responsive to changes in centrifugal force. The regulating means can comprise blocking means which renders the damping means inoperative in response to a reduction of the rotational speed of the two parts below a preselected value. Such blocking means can comprise means for coupling (e.g., for rigidly connecting) the two parts to each other. The blocking means can be said to constitute a means for abruptly reducing the resistance which the damping means offers to rotation of the two parts relative to each other.

The regulating means can be designed to reduce the resistance of the damping means to relative angular movement of the two parts in response to increasing rotational speed of the parts, for example, in such a way that the resistance decreases progressively in response to increasing rotational speed of the two parts.

The regulating means can be constructed and assembled in such a way that the resistance of the damping means to relative rotation of the two parts is reduced when the rotational speed of the parts is below the idling RPM of the engine which drives the one part. The regulating means can also include means for intensifying the resistance of the damping means below a predetermined range of rotational speeds of the two parts (such range is below the idling RPM of the engine) and for lessening the resistance when the rotational speed of the parts exceeds the aforementioned range. At the present time, it is preferred that the upper limit of the aforementioned range be at least approximately 80 percent of the idling RPM of the engine. For example, the resistance of the damping means can be intensified when the rotational speed of the two parts is between 20 and 80 percent (more preferably between 30 and 70 percent) of the idling RPM of the engine.

The regulating or influencing means can comprise at least one auxiliary damping means which is operative to resist the angular movements of the two parts relative to each other when the rotational speed of the parts drops below a predetermined value. Such auxiliary damping means can be rendered inoperative by centrifugal force when the rotational speed of the parts is above the just mentioned predetermined value. The auxiliary damping means can comprise a friction generating device, and such friction generating device can include a first friction generating component which is provided on the first part and a second friction generating component which is in frictional engagement with and is rotatable relative to the first friction generating component. The second friction generating component is normally in torque-receiving engagement with the second part and is arranged to become disengaged from the second part by centrifugal force when the rotational speed of the two parts rises above the predetermined value. The second part preferably comprises a device which is movable under the action of centrifugal force from a position of torque-transmitting engagement with to a position of disengagement from the second component. The second component can comprise at least one first coupling portion, and the aforementioned device of the second part can include a resilient element and at least one second coupling portion provided on the resilient element and engaging the first coupling portion when the rotational speed of the two parts is below the predetermined value. The resilient means preferably comprises at least one leaf spring one end portion of which is affixed to the main portion of the second part and a second end portion which supports the second coupling portion and is spaced apart from the first end portion, as considered in the circumferential direction of the two parts. The second end portion of the spring is movable substantially radially of the two parts under the action of centrifugal force to thereby disengage the second coupling portion from the first coupling portion. One of the coupling portions can be provided with several first teeth and the other coupling portion can have at least one second tooth which meshes with one or more first teeth when the rotational speed of the two parts is below a predetermined value at which the auxiliary damping means is to influence the first mentioned or primary damping means by also opposing rotation of the two parts relative to each other.

Otherwise stated, the auxiliary damping means or the aforementioned blocking means can be said to comprise at least one first coupling portion which is provided on the first part (this first part is the one or the other part) and at least one second coupling portion provided on the second part and normally engaging the first coupling portion. The second coupling portion is movable substantially radially outwardly of the two parts and out of engagement with the first coupling portion when the rotational speed of the two parts exceeds the predetermined value at which the resistance to relative rotation of the two parts should decrease.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
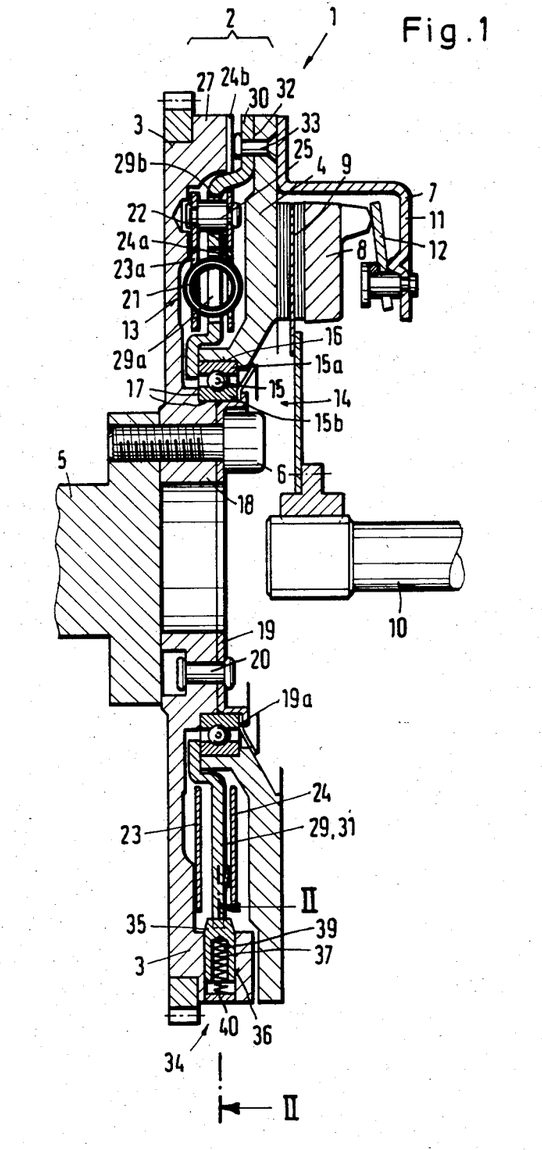
FIG. 1 is a first fragmentary axial sectional view of an assembly which embodies one form of the invention.
Figures 1A, 2, 3:
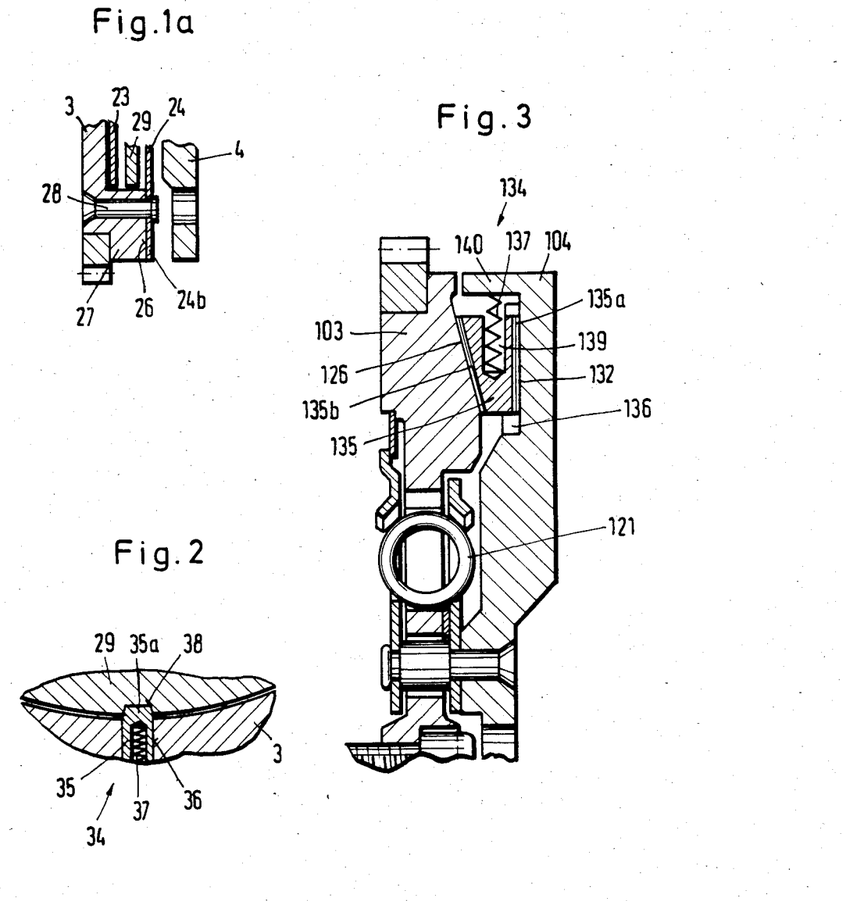
FIG. 1a is a second fragmentary axial sectional view of the assembly of FIG. 1 in a plane which is angularly offset with reference to the plane of FIG. 1.
FIG. 2 is a fragmentary sectional view as seen in the direction of arrows from the line II—II of FIG. 1.
FIG. 3 is a fragmentary axial sectional view of a second assembly wherein the resistance to angular displacement of the two parts relative to each other varies continuously in response to changes of the RPM.

Referring first to FIGS. 1, 1a and 2, there is shown a portion of a motor vehicle including a compensating assembly 1 which embodies one form of the invention. The assembly 1 includes a flywheel 2 composed of two coaxial masses or parts 3, 4 which are rotatable within limits relative to each other. The part 3 is mounted on and receives torque from the crankshaft 5 of the internal combustion engine. The means for connecting the part 3 to the crankshaft 5 comprises a set of screws 6 or other suitable fasteners. The part 4 supports a friction clutch 7 which is affixed thereto by screws (not shown) or other suitable fastener means. The clutch 7 comprises a pressure plate 8 and a clutch disc 9 which is disposed between the pressure plate 8 and the part 4 and is affixed to the input shaft 10 of a change-speed transmission in the motor vehicle. A diaphragm spring 12 is tiltably mounted on a clutch cover or housing 11 and normally urges the pressure plate 8 against the adjacent friction lining of the clutch disc 9 so that the other friction lining of the disc 9 bears against the part 4 of the flywheel 2. The disengagement of clutch 7 entails a termination of transmission of torque from the crankshaft 5 to the input shaft 10. The manner in which the friction clutch 7 can be disengaged (by pivoting or tilting the diaphragm spring 12 relative to the housing 11) is not specifically shown in the drawing. Reference may be had, for example, to commonly owned U.S. Pat. No. 4,410,074 granted Oct. 18, 1983 to Paul Maucher et al.

A damping device 13 operates between the parts 3 and 4 of the flywheel 2 and yieldably opposes relative angular movements of the parts 3 and 4. The means for mounting the parts 3 and 4 in such a way that they can rotate, within limits, relative to each other includes a bearing system 14 including or constituting an antifriction ball or roller bearing 15 having an outer race 15a which is received in an internal recess 16 of the part 4. The inner race 15b of the bearing 15 abuts against a shoulder 17 which is provided in an extension 18 of the part 3; such extension is the innermost portion of the part 3 and is affixed to the crankshaft 5 by the aforementioned screws 6. A sheet metal retainer 19 is provided to maintain the inner race 15a of the antifriction bearing 15 in abutment with the shoulder 17. The retainer 19 is secured to the part 3 by rivets 20 and its radially outermost marginal portion 19a engages the inner race 15b to urge it against the shoulder 17, i.e., against the part 3.

The damping device 13 comprises energy storing means in the form of coil springs 21 (only one shown) as well as friction generating means 22 serving to damp the movements of the springs 21 as well as vibrations between the parts 3 and 4.

The input component of the damping device 13 includes two discs 23, 24 which are non-rotatably connected to each other by distancing elements in the form of rivets 25. The periphery of the disc 24 is formed with radially outwardly extending prongs or arms 24b which abut against the end face 26 of a ring-shaped axial projection or extension 27 of the part 3. Rivets 28 are provided to secure the arms 24b to the projection 27. A flange-like coupling component or member 29 between the discs 23, 24 constitutes the output element of the damping device 13. The periphery of the output element or coupling component 29 is provided with radially extending arms or prongs 30 which are axially offset with reference to its central portion 31 between the discs 23 and 24. The prongs 30 abut against the end face 32 of part 4 and are secured thereto by rivets 33. The arms 24b of the disc 24 and the prongs 30 of the output element 29 are offset relative to each other, as considered in the circumferential direction of the damping device 13 and parts 3, 4.

The discs 23, 24 and the central portion 31 of the output element 29 are respectively provided with openings or windows 23a, 24a, 29a for the coil springs 21 of the damping device 13. The distribution and dimensioning of the windows 23a, 24a, 29a and coil springs 21, as considered in the circumferential direction of the parts 3 and 4, are selected in such a way that the damping device 13 exhibits a multi-stage characteristic curve. In the embodiment of FIGS. 1, 1a and 2, the friction generating means 22 which cooperates with the coil springs 21 constitutes or resembles a diaphragm spring which is installed, in prestressed condition, between the disc 24 and the output element 29 so that it tends to move such members axially and away from each other.

The output element 29 is further formed with arcuate cutouts 29b for the distancing elements 25 which connect the discs 23 and 24 to each other. The shanks of the distancing elements 25 cooperate with the surfaces bounding the respective arcuate cutouts 29b to determine the maximum extent of relative angular movement between the parts 3 and 4 of the flywheel 2. Thus, the angular movement of the part 3 relative to the part 4 (or vice versa) in a clockwise or in a counterclockwise direction is terminated when the shanks of the distancing elements 25 abut against the surfaces at the one or the other end (as considered in the circumferential direction of the flywheel 2) of the respective arcuate cutouts 29b.

In order to ensure that starting or stoppage of the internal combustion engine (i.e., a reduction of the RPM below the idling RPM) will not entail any or any pronounced swinging of the part 3 and/or 4 as a result of the thus initiated excitations, the assembly 1 further comprises a blocking device 34 which regulates or influences the damping action of the device 13 and is arranged to non-rotatably couple the parts 3 and 4 to each other as soon as the RPM drops below the idling RPM. The blocking device 34 comprises at least one coupling component in the form of a radially movable locking bolt 35 which is mounted in the part 3, namely in a radially extending bore 36 of the part 3. The locking bolt 35 is biased radially inwardly by an energy storing device in the form of a coil spring 37 which reacts against a closure or plug 40 and bears against the bottom surface in a blind bore 39 of the bolt 35. The inner end portion 35a of the locking bolt 35 is receivable in a complementary socket or recess 38 which is machined into the output element or coupling component 29 of the damping device 13. The socket 38 can constitute a notch which is machined into or otherwise formed in the peripheral surface of the output element 29. At least the radially outermost portion of the bore 36 is tapped so that the internal threads therein can mate with the external threads of the plug 40. The latter can be used as a means for adjusting the bias of the coil spring 37. The bias of the spring 37 is selected in such a way that the centrifugal force of the locking bolt 35 suffices to maintain its inner end portion 35a out of the socket 38 when the RPM of the flywheel 2 reaches or exceeds the idling RPM. For example, the bias of the spring 37 can be selected or adjusted in such a way that the end portion 35a of the locking bolt 35 extends into the socket 38 of the output element 29 when the RPM of the flywheel 2 is not in excess (or not appreciably in excess) of 80 percent of the idling RPM of the internal combustion engine. In other words, the damping device 13 is idle or ineffective when the blocking device 34 is effective to lock the output element 29 to the part 3.

When the internal combustion engine is turned off, the RPM of the flywheel 2 decreases with attendant decrease of the centrifugal force acting upon the locking bolt 35. Therefore, the spring 37 is then free to shift the locking bolt 35 radially inwardly and to move its inner end portion 35a into the socket 38 of the output element 29. Such penetration of the end portion 35a into the socket 38 takes place when the RPM drops to a preselected minimum value which can be varied by changing the bias of the spring 37 (e.g., by rotating the plug 40) or by replacing the illustrated spring 37 with another (stronger or weaker) spring. The illustrated blocking device 34 effects a rather abrupt reduction or increase of the damping action of the device 13, i.e., the damping action is abruptly reduced to zero when the end portion 35a of the locking bolt 35 penetrates into the recess or socket 38, and such damping action rises abruptly from zero to a substantial value when the magnitude of centrifugal force acting upon the bolt 35 suffices to compress the spring 37 so that the inner end portion 35a of the bolt 35 leaves the socket 38 and allows the part 3 to change its angular position relative to the output element 29 and hence also relative to the part 4 (which is attached to the output element 29 by the rivets 33).

The coupling components 29, 35 can positively lock the parts 3, 4 to each other to thus influence (i.e., reduce to zero) the effective resistance which the damping device 13 (including its springs 21 and friction generating means 22) can offer to rotation of the parts 3, 4 relative to each other.

The improved assembly ensures that the resistance which the damping device 13 offers to rotation of the parts 3 and 4 relative to each other is more pronounced when the rotational speed of such parts is low, e.g., when the rotational speed of the parts 3 and 4 is below the idling RPM of the engine. However, the damping device 13 is free to operate normally as soon as the predetermined RPM is reached or exceeded, e.g., when the rotational speed of the parts 3 and 4 reaches or exceeds the idling RPM of the engine. In other words, when the blocking device 34 is ineffective (because the centrifugal force acting upon the coupling component or locking bolt 35 is sufficiently high to keep its inner end portion 35a out of the socket 38), its resistance to relative angular displacement of the parts 3, 4 increases progressively with the extent of such angular displacement. Consequently, and since the resistance of the assembly to relative angular displacement of the parts 3 and 4 is higher at lower RPM of the engine (e.g., at a rotational speed of the parts 3 and 4 which is below the idling RPM of the engine), the assembly effectively prevents an undesirable increase in the amplitude of vibrations of the parts 3 and 4 at such critical stage or stages of operation (e.g., during starting or during stoppage of the engine).

In the embodiment of FIG. 1, the blocking device 34 constitutes a means which influences the damping device 13 in such a way that the combined resistance of the damping device and blocking device to rotation of the parts 3 and 4 reaches the maximum possible value, i.e., the parts 3 and 4 are positively coupled to each other so that they are held against any angular movement with reference to each other, when the RPM of the engine is such that the spring 37 can overcome the centrifugal force acting upon the locking bolt 35.

FIG. 3 shows a portion of a damping device (note the coil spring 121) which is installed between the part 103 (corresponding to the part 3 of FIG. 1 and receiving torque from the internal combustion engine) and the part 104 which is rigidly connected with the input element of the change-speed transmission of the motor vehicle or is connected with the input element of the change-speed transmission by a friction clutch (not shown) corresponding to the friction clutch 7 of FIG. 1. The structure of FIG. 3 further includes a modified means for influencing or regulating the resistance which the damping device including the coil spring 121 offers to rotation of the parts 103, 104 relative to each other. Such influencing or regulating means includes a friction generating device 134 which is actuated by centrifugal force and comprises a friction shoe 135 which has a substantially wedge-shaped cross-sectional outline and tapers radially inwardly toward the common axis of the parts 103 and 104. The two major surfaces of the shoe 135 carry friction linings 135a and 135b made of a suitable friction generating material, e.g., a material which can be used or is used in or on the friction linings of clutch discs (note the clutch disc 9 of FIG. 1). The linings 135b and 135a are respectively adjacent to the surfaces 126, 132 of the parts 103, 104. The inclination of the surfaces 126, 132 matches or closely approximates the inclination of the planes of the respective linings 135b, 135a on the shoe 135. The shoe 135 is biased radially inwardly of the flywheel including the parts 103, 104 by an energy storing device in the form of one or more coil springs 137 which tends or tend to wedge the shoe 135 between the adjacent surfaces 126 and 132. The outermost convolution of the coil spring 137 which is shown in FIG. 3 reacts against a circumferentially extending collar 140 at the periphery of the part 104. The collar 140 extends axially from the major part of the part 104 in a direction toward the periphery of the part 103.

The mounting and mode of operation of the coil springs 121 (only one shown) are analogous to those of coil springs 21 in the embodiment of FIGS. 1, 1a and 2.

The inner portion of the coil spring 137 which is shown in FIG. 3 extends into a blind bore 139 which is machined into the outer end face of the friction shoe 135 and is inserted in prestressed condition so that it biases the linings 135b, 135a of the shoe against the adjacent surfaces 126, 132 of the parts 103, 104 with a predetermined force. Depending on the use of the assembly which embodies the damping device of FIG. 3, the force with which the spring 137 urges the shoe 135 radially inwardly can be selected in such a way that the centrifugal force acting upon the shoe 135 overcomes the force of the spring 137 when the actual RPM of the engine and hence of the flywheel including the parts 103, 104 is below or above the idling RPM. This moves the left-hand lining 135b of the shoe 135 out of contact with the adjacent surface 126 of the part 103 so that the springs 121 of the damping device are free to influence the angular movements of the parts 103 and 104 relative to each other. The shoe 135 extends circumferentially of the parts 103, 104 through a preselected angle. The means for confining the shoe 135 to radial movement with reference to the part 104 comprises one or more radially extending grooves 136 which are machined into the part 104 and receive complementary projections (e.g., ribs) of the shoe 135. The maximum extent of radially outward movement of the shoe 135 is determined by the collar 140 of the part 104.

For example, the bias of the spring 137 which is shown in FIG. 3 can be selected in such a way that the friction generating device 134 including the shoe 135 is effective within the range between zero RPM and an RPM which corresponds to 80 percent of the idling RPM of the engine. In other words, the lining 135b is disengaged from the surface 126 of the part 103 when the RPM of the flywheel including the parts 103, 104 approaches, reaches or exceeds 80 percent of the idling RPM.

The frictional damping action of the friction generating device 134 of FIG. 3 decreases gradually (progressively) and continuously with increasing RPM of the parts 103 and 104. Thus, the increasing centrifugal force acting upon the shoe 135 gradually overcomes a progressively increasing fraction of the force with which the prestressed spring 137 urges the lining 135b into frictional engagement with the surface 126 of the part 103. The frictional damping action of the device 134 acts in parallel with the coil springs 121.

Though FIG. 3 merely shows a single friction generating device 134, the arrangement can include two or more identical devices 134 which are uniformly distributed around the axis of the flywheel including the parts 103 and 104, i.e., in the circumferential direction of such parts.

The friction generating device 134 of FIG. 3 can be said to constitute a further damping device which becomes effective as soon as the RPM of the engine drops below a predetermined value so that the damping action is more pronounced when the RPM is relatively low and less pronounced (only the primary damping device is active) when the RPM rises above a predetermined value. The arrangement may be such that the friction generating device 134 assists the primary damping device in resisting relative angular displacements of the parts 103 and 104 when the RPM of the parts 103, 104 is between 20 and 80 percent of the idling RPM, preferably between 30 and 70 percent of idling RPM. The activation of friction generating device within certain ranges of RPM of the parts 103, 104 ensures that the system is then out of tine, i.e., that the fundamental frequency of the system is shifted into a range of rotational speeds which prevails only during a very or extremely short interval of time or is not reached at all.

The friction generating device 134 of FIG. 3 can be replaced with one or more springs and with means which cause such springs to resist angular movements of the part 103 relative to the part 104 and/or vice versa within a certain range of rotational speeds but becomes ineffective as soon as such range is exceeded, e.g., as soon as the RPM of the parts 103, 104 approaches, equals or exceeds 80 percent of idling RPM of the engine.

The feature that the means for influencing the primary damping device for the parts 3, 4 or 103, 104 is operated by centrifugal force (i.e., in response to changes in rotational speeds of the parts) contributes to simplicity and reliability of the assembly.

The friction generating assembly 134 of FIG. 3 or an analogous assembly can be used with advantage in motor vehicles wherein it is desirable that the resistance which the parts 103, 104 encounter to angular movement relative to each other vary gradually within a certain range of rotational speeds, e.g., within the aforementioned range between 20 and 80 percent of idling RPM. This is in contrast to the operation of the assembly of FIGS. 1, 1a and 2 wherein the damping device 13 and the blocking device 34 can cooperate to effect a very abrupt change in the resistance which the parts 3 and 4 encounter to angular movement relative to each other. Actually, when the blocking device 34 of FIGS. 1, 1a and 2 is operative (i.e., when the end portion 35a of the bolt 35 has penetrated into the socket 38), the primary damping device 13 is bypassed and the damping action is furnished exclusively by the device 34 which, in effect, establishes a rigid coupling connection between the parts 3 and 4. At such times, the parts 3, 4 act not unlike a simple one-piece flywheel.

The point at which the means for influencing or regulating the resistance of the primary damping device becomes effective can be selected particularly at will and may be above or below the idling RPM of the engine. In many instances, the influencing or regulating means will become effective within a range of rotational speeds which is below the idling RPM, e.g., whose upper limit is at or close to 80 percent of idling RPM.

Figure 4:
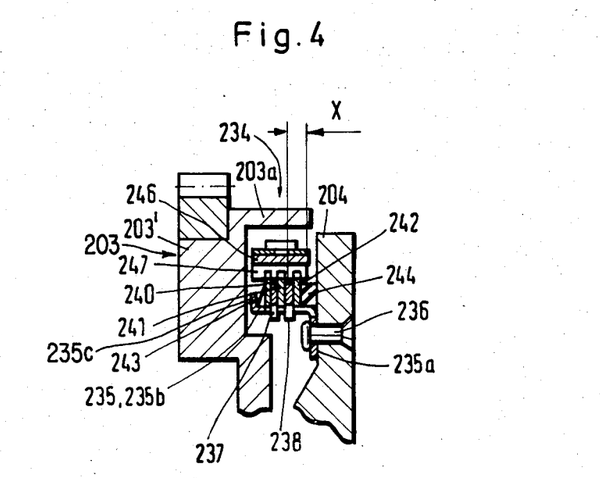
FIG. 4 is a fragmentary axial sectional view of a third assembly.
Figure 5:
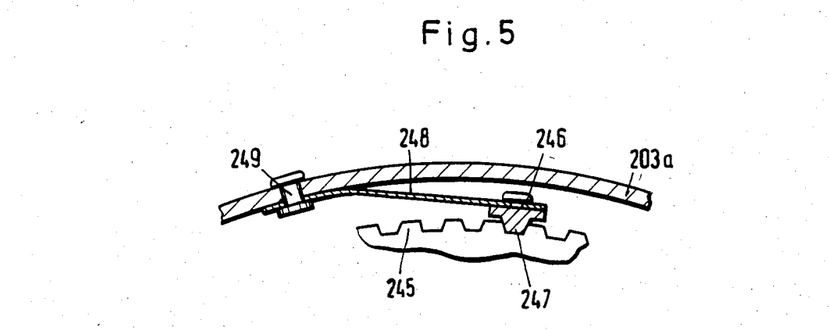
FIG. 5 is a fragmentary end elevational view as seen from the right-hand side of FIG. 4.

FIGS. 4 and 5 illustrate a further embodiment of the invention. The parts 203 and 204 correspond to the parts 103, 104 of the flywheel which is shown in FIG. 3 and are movable, within limits, relative to each other (as considered in the circumferential direction of such parts) against the opposition of coil springs (not shown) corresponding to the springs 21 or 121 and forming part of the primary damping device.

The radially outermost portions of the parts 203 and 204 cooperate with an auxiliary damping device 234 having mobile parts which are movable in part axially and in part circumferentially of the flywheel. The device 234 of FIGS. 4 and 5 performs a regulating or influencing function which is analogous to that of the device 34 or 134 and comprises a support or carrier 235 having a radially inwardly extending portion 235a secured to the part 204 by one or more rivets 236 or other suitable fasteners. The axially extending portion 235b of the carrier 235 supports and is non-rotatably connected with a first friction generating component having two rings 237, 238. A second friction generating component has three rings 240, 241 and 242 which are supported by but are not non-rotatably secured to the axially extending carrier portion 235b. The rings 240, 241 and 242 alternate with the rings 237 and 238, as considered in the axial direction of the carrier portion 235b. In other words, each of the rings 237, 238 is disposed between two rings (240, 241 and 241, 242) which are free to rotate relative to the carrer 235.

A diaphragm spring 243 is installed between the radially outwardly extending third portion 235c of the carrier 235 and the adjacent ring 240. The radially outermost portion of the diaphragm spring 243 bears against the ring 240 and urges the latter axially in a direction toward the part 204 of the flywheel. The radially innermost portion of the annular diaphragm spring 243 reacts against the right-hand side of the third portion 235c of the carrier 235.

A further or intermediate ring 244 is disposed between the part 204 and the ring 242. The rings 237, 238 have internal teeth which extend into axially parallel slots of the axially extending central portion 235b of the carrier 235 so that the rings 237, 238 are free to move axially between the parts 203, 204 but cannot rotate with reference to the carrier 235. The radially outermost portions of the rings 240, 241 and 242 are provided with teeth 245 which constitute coupling portions, which define between themselves tooth spaces (see particularly FIG. 5) and which serve to establish a non-rotatable connection between the rings 240-242 and the part 203. The latter carries a device which is movable under the action of centrifugal force and includes a leaf spring 248 secured to a circumferentially extending annular or arcuate collar 203a on the main portion 203' of the part 203 by one or more rivets 249 or other suitable fasteners and carrying a coupling portion or tooth 247 which is secured thereto by one or more rivets 246 or the like. The leaf spring 248 is prestressed so that it urges its tooth 247 into mesh with the adjacent teeth 245 of the rings 240-242. The tooth 247 is provided at that end of the leaf spring 246 which is remote from the rivet or rivets 249, as considered in the circumferential direction of the parts 203 and 204.

The bias (i.e., the initial stress) of the leaf spring 248 is selected in such a way that the tooth 247 engages the adjacent teeth 245 of the rings 240-242 with a preselected force. As the RPM of the flywheel including the parts 203, 204 increases, the centrifugal force acting upon the leaf spring 248 and its tooth 247 also increases and the tooth 247 is disengaged from the teeth 245 of the rings 240-242 when the RPM reaches a preselected value or one of a preselected range of values. When the device 246-248 including the leaf spring 248 is disengaged from teeth 245 of the rings 240-242, the damping action between the parts 203 and 204 is interrupted because the connection between the part 203 and the rings 240-242 is interrupted. However, when the RPM of the flywheel including the parts 203, 204 drops below a preselected value or a preselected range of values, the centrifugal force acting upon the leaf spring 248 decreases sufficiently to enable the spring 248 to move its tooth 247 back into mesh with the adjacent teeth 245 of the rings 240-242 so that the damping action is reestablished and remains in effect at such RPM as well as at any lower RPM. The damping action is furnished, at least in part, by the rings 237, 238, 240, 241, 242, 244 which are in frictional engagement with one another. The bias of the leaf spring 248 can be altered in any conventional way, or the entire leaf spring can be replaced with a differently stressed leaf spring if the RPM at which the spring 248 overcomes the centrifugal force and reengages its tooth 247 with the adjacent teeth 245 is to be changed.

In order to achieve a staggered damping action, the structure a portion of which is shown in FIGS. 4 and 5 can comprise two or more auxiliary damping devices 234 each of which has a differently stressed leaf spring 248 so that the various leaf springs disengage their respective teeth 247 from the adjacent teeth 245 at different rotational speeds of the flywheel including the parts 203 and 204. For example, the assembly which embodies the parts shown in FIGS. 4 and 5 can be provided with three auxiliary damping devices 234 which are equidistant from one another, as considered in the circumferential direction of the parts 203, 204. The axial length (note X in FIG. 4) of the teeth 247 on the three leaf springs 248 is then selected in such a way that each of the three teeth 247 mates only with the teeth 245 of a single ring 240, 241 or 242 and that the teeth of the three leaf springs mate with the teeth of different rings. By subjecting the three leaf springs to different initial stresses, one obtains a three-stage regulating or influencing device each stage of which responds to a different RPM of the flywheel including the parts 203, 204 and each of which can become ineffective at a different RPM.

The provision of a leaf spring 248 which is yieldable, as considered in the circumferential direction of the parts 203 and 204, is desirable and advantageous because such spring prevents the application of excessive stresses to the parts (coupling portions) which are locked to each other when the device including the leaf spring 248 engages the friction generating component including the rings 240, 241 and 242.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An assembly for taking up and compensating for torque-induced shocks, especially for taking up and compensating for fluctuations of torque which is transmitted by an internal combustion engine to a change-speed transmission in a motor vehicle, comprising a flywheel including coaxial first and second parts mounted for rotation at a variable speed and for limited angular movement relative to each other, one of said parts being arranged to receive torque from the engine and the other of said parts being arranged to transmit torque to the input element of the transmission; damping means operative to resist said relative angular movement; and means for regulating the resistance to rotation of said parts relative to each other so that such resistance decreases with increasing rotational speed of said parts.

2. The assembly of claim 1, wherein said regulating means is responsive to changes in centrifugal force.

3. The assembly of claim 1, wherein said regulating means comprises blocking means for rendering said damping means inoperative in response to a reduction of the rotational speed of said parts below a preselected value.

4. The assembly of claim 3, wherein said blocking means includes means for coupling said parts to each other.

5. The assembly of claim 4, wherein said coupling means includes means for rigidly connecting said parts to each other.

6. The assembly of claim 1, wherein said regulating means includes means for reducing the resistance of said damping means in response to increasing rotational speed of said parts.

7. The assembly of claim 6, wherein said means for reducing the resistance includes means for progressively increasing such resistance in response to decreasing rotational speed of said parts.

8. The assembly of claim 6, wherein said means for reducing the resistance includes means for abruptly reducing such resistance in response to increasing rotational speed of said parts.

9. The assembly of claim 1, wherein said regulating means includes means for reducing said resistance when the rotational speed of said parts is below the idling RPM of the engine which drives said one part.

10. The assembly of claim 1, wherein said regulating means includes means for effecting an intensification of the resistance of said damping means below a predetermined range of rotational speeds of said parts and for effecting a lessening of the resistance when the rotational speed of said parts exceeds said range, said range being below the idling RPM of the engine which drives said one part.

11. The assembly of claim 10, wherein the upper limit of said range is at least approximately 80 percent of the idling RPM of the engine.

12. The assembly of claim 10, wherein the resistance of said damping means is intensified at least when the rotational speed of said parts is between 20 and 80 percent of the idling RPM of the engine.

13. The assembly of claim 10, wherein the resistance of said damping means is intensified at least when the rotational speed of said parts is between 30 and 70 percent of the idling RPM of the engine.

14. The assembly of claim 1, wherein said regulating means comprises at least one auxiliary damping means which is operative to resist said relative angular movement when the rotational speed of said parts drops below a predetermined value.

15. The assembly of claim 14, wherein said auxiliary damping means is rendered inoperative by centrifugal force when the rotational speed of said parts is above said predetermined value.

16. The assembly of claim 15, wherein said auxiliary damping means includes a friction generating device.

17. The assembly of claim 16, wherein said friction generating device includes a first friction generating component provided on said first part and a second friction generating component which is in frictional engagement with and is rotatable relative to said first component, said second component being normally in torque receiving engagement with said second part and being arranged to become disengaged from the second part by centrifugal force when the rotational speed of said parts rises above said predetermined value.

18. The assembly of claim 17, wherein said second part comprises a device which is movable under the action of centrifugal force from a position of torque-transmitting engagement with to a position of disengagement from said second component.

19. The assembly of claim 18, wherein said second component includes at least one first coupling portion and said device includes a resilient element and at least one second coupling portion provided on said resilient element and engaging said first coupling portion when the rotational speed of said parts is below said predetermined value.

20. The assembly of claim 19, wherein said resilient element includes at least one leaf spring.

21. The assembly of claim 20, wherein said second part includes a main portion and said spring has a first portion affixed to said main portion and a second portion supporting said second coupling portion and spaced apart from said first portion, as considered in the circumferential direction of said parts, said second portion of said spring being movable substantially radially of said parts under the action of centrifugal force.

22. The assembly of claim 19, wherein said first coupling portion has a plurality of teeth and said second coupling portion includes a second tooth which is movable into and from mesh with said first teeth.

23. The assembly of claim 14, wherein said auxiliary damping means comprises at least one first coupling portion provided on said first part and at least one second coupling portion provided on said second part and normally engaging said first coupling portion, said second coupling portion being movable substantially radially outwardly of said parts and out of engagement with said first coupling portion when the rotational speed of said parts rises above said predetermined value.

24. The assembly of claim 1, further comprising blocking means for rendering said damping means inoperative in response to a reduction of the rotational speed of said parts below a preselected value, including at least one first coupling portion provided on said first part and at least one second coupling portion provided on said second part and normally engaging said first coupling portion, said second coupling portion being movable substantially radially outwardly of said parts and out of engagement with said first coupling portion when the rotational speed of said parts rises above said preselected value.

25. An assembly for taking up and compensating for torque-induced shocks, especially for taking up and compensating for fluctuations of torque which is transmitted by an internal combustion engine to a change-speed transmission in a motor vehicle, comprising a flywheel including coaxial first and second parts mounted for rotation at a variable speed and for limited angular movement relative to each other, one of said parts being arranged to receive torque from the engine and the other of said parts being arranged to transmit torque to the input element of the transmission; damping means operative to resist said relative angular movement; and means for regulating the resistance to rotation of said parts relative to each other so that such resistance increases with decreasing rotational speed of said parts.

26. An assembly for taking up and compensating for torque-induced shocks, especially for taking up and compensating for fluctuations of torque which is transmitted by an internal combustion engine to a change-speed transmission in a motor vehicle, comprising a flywheel including coaxial first and second parts mounted for rotation at a variable speed and for limited angular movement relative to each other, one of said parts being arranged to receive torque from the engine and the other of said parts being arranged to transmit torque to the input element of the transmission; damping means operative to resist said relative angular movement; and means for regulating the resistance to rotation of said parts relative to each other so that such resistance varies stepwise in response to increasing rotational speed of said parts.

* * * * *

UNITED STATES PATENT AND TRADEMARK OFFICE
CERTIFICATE OF CORRECTION

PATENT NO. : 4,638,684

DATED : January 27, 1987

INVENTOR(S) : Paul MAUCHER

It is certified that error appears in the above-identified patent and that said Letters Patent is hereby corrected as shown below:

```
Col. 12, line 7, (line 7 of claim 1), the word "limited"
         should be deleted;
Col. 12, line 13 (line 13 of claim 1), the words --so
         that said parts are rotatable within limits
         relative to each other-- should be inserted
         after "ment" (but before the semicolon).
Col. 14, line 23 (line 7 of claim 25), the word "limited"
         should be deleted;
Col. 14, line 29 (line 13 of claim 25), the words --so
         that said parts are rotatable within limits
         relative to each other-- should be inserted
         after "ment" (but before the semicolon).
Col. 14, line 39 (line 7 of claim 26), the word "limited"
         should be deleted;
Col. 14, line 45 (line 13 of claim 26), the words --so
         that said parts are rotatable within limits
         relative to each other-- should be inserted
         after "ment" (but before the semicolon).
```

Signed and Sealed this

Twenty-third Day of August, 1988

*Attest:*

DONALD J. QUIGG

*Attesting Officer*   *Commissioner of Patents and Trademarks*